United States Patent Office 3,478,475
Patented Nov. 18, 1969

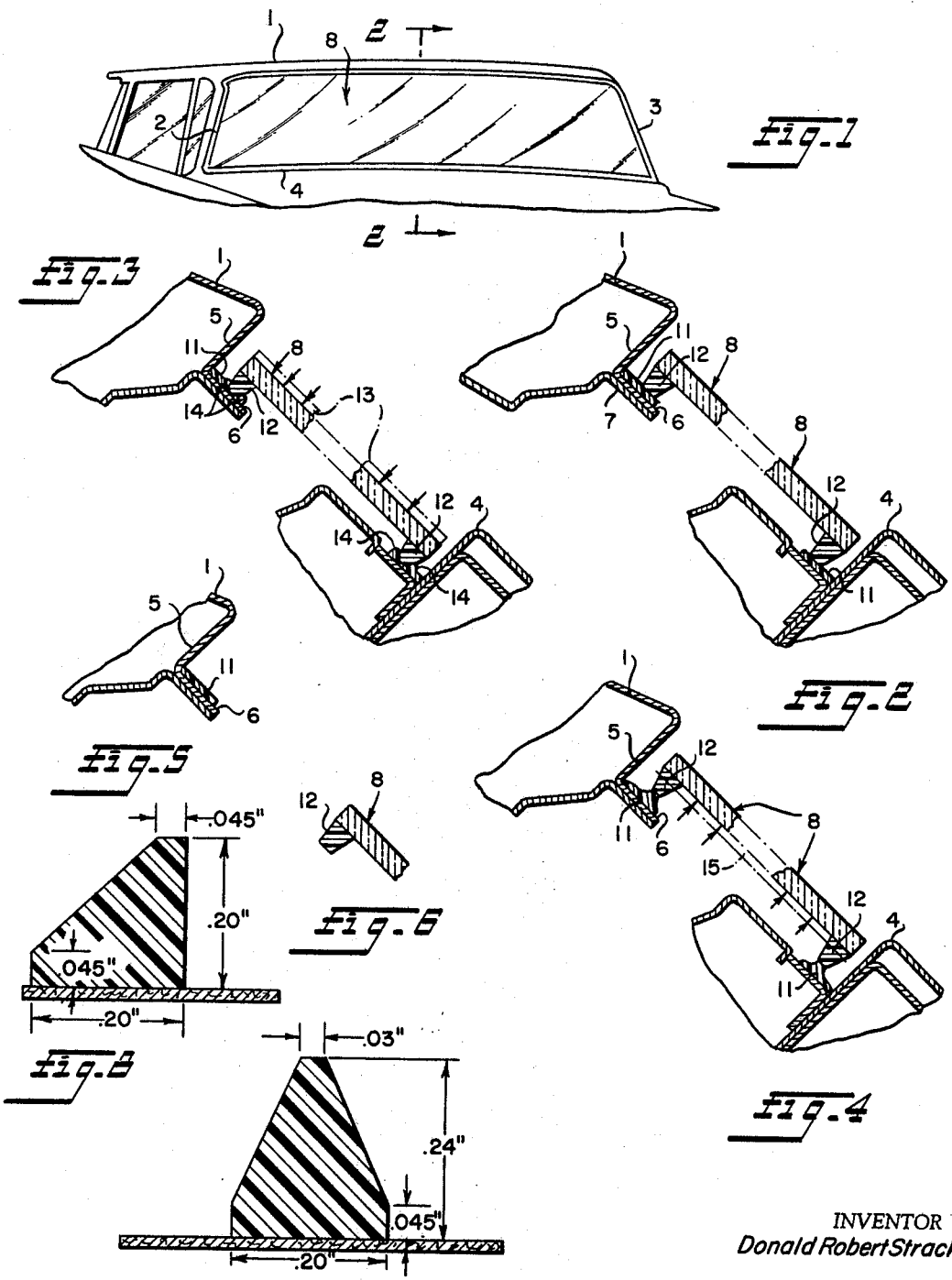

3,478,475
MOUNTING UNIT EMPLOYING DUAL GASKET CONSTRUCTION
Donald R. Strack, Dayton, Ohio, assignor to Protective Treatments Inc., Dayton, Ohio, a corporation of Ohio
Filed Jan. 23, 1967, Ser. No. 611,129
Int. Cl. B60j 1/02; E06b 3/62, 3/02
U.S. Cl. 52—208                                6 Claims

ABSTRACT OF THE DISCLOSURE

A supported element such as a windshield is resiliently mounted on a support element such as the pinch weld flange of an automobile using two self-sustaining elastomeric strips. The first strip is desirably triangular and secured to the periphery of the windshield and is of resilient load bearing material which is too stiff to handle tension forces without delamination if used alone. The second strip is adhered to the pinch weld flange and is desirably flat and is too soft and deformable to handle compressive forces without flowing away if used alone. The mounting of the windshield is effected when the two strips are strongly adhered together, preferably at a narrow interface. In the composite, the triangular strip bears the compressive forces which are encountered and the flat strip accommodates the tensive forces. In the construction of the respective strips, a curable elastomer is used with large proportions of oil plasticizer and filler. The mixture is extruded into the desired form and then cured.

---

This invention relates to glazed structures and to sealing gaskets therefor. The invention is applicable to glazed structures in general, but is herein described with special reference to automobile windshields and back lights.

It has been proposed to seal the windshield glass and back light in an automobile by means of a dough like gasket, which is compounded to cure and thereby develop permanent hardness or resistance to deformation in the site after installation. The flange surrounding the windshield opening on the inside (the operator's side) is called the pinch weld flange, and it provides the backstop for the windshield. In the arrangement above described the dough like gasket is inserted as a tape or layer against the pinch weld flange and the windshield light is pressed in place against the gasket. The tape adheres to the pinch weld flange and windshield light and provides a seal or gasket, and the joint between the glass and frame is covered by an ornamental moulding. In some instances a primer is applied adjacent the edge of the windshield light to promote adhesion between the gasket and glass, and applied to the pinch weld flange to promote adhesion between the gasket and flange.

Under favorable conditions the gasket is soft initially to facilitate installation of the windshield light and cures to resist the pressure forces applied against the windshield light in the operation of the automobile before such forces cause excessive extrusion of the gasket. However, conditions are encountered where the gasket is extruded or flows excessively and may even extend into the sight areas of the driver before the curing reaction develops sufficient firmness or hardness. Furthermore, after hardening or firming of the gasket occurs, the vibration and torsion to which the frame is subjected in driving the automobile can break the bond between the hardened gasket and the glass or the frame. When this occurs the hardened gasket will not reseal to the glass or metal, and water leakage can occur.

Another proposed construction involves the use of a relatively firm, resilient gasket which is cemented to the pinch weld and windshield light. This gasket is sometimes applied in a soft state in separate moieties to the pinch weld flange and glass, and upon assembly, the two moieties merge to form one gasket which becomes hardened by curing. However, the vibration and repeated jolting to which the car body is subjected in driving over rough roads can break the seals made to the cured gasket and the cured gasket cannot thereafter restore the seal. This inability to restore the seal is present in all types of installations heretofore proposed wherein the gasket is required to develop necessary hardness and stiffness through cure after installation. The same inability to restore the seal takes place when a hardened or firm gasket is initially installed and these furthermore required high pressure or cementing for installation. All prior installations employing a soft, deformable gasket can develop the unsightly extrusion of gasket along the glass described above.

According to the present invention I provide a glazed structure comprising a first firm, resilient gasket adhesively secured to the glass adjacent its edge, which first gasket is seated on a second gasket of doughy consistency adhesively attached to the socket or frame which receives the glass. In this construction, the firm, resilient gasket which I identify as the first or A-gasket, provides a permanent resilient spacer between the glass and frame which resists compressive forces without unsightly extrusion, while the doughy gasket which I identify as the second or B-gasket serves to level irregularities of the frame and provides an attachment of the firm resilient A-gasket to the frame which prevents tensive forces from breaking the gasket seals, and especially the more vulnerable gasket to glass seal.

Preferably the firm resilient A-gasket is adhesively attached to the glass surface, and presents a surface of contact with the doughy B-gasket of smaller area than the surface of the gasket contacting the glass. Thus, compressive forces on the glass which cause the firm A-gasket to penetrate the doughy B-gasket, cause only a small volume displacement of the doughy B-gasket. Furthermore, because there is always a space provided by the firm A-gasket between the frame and glass, this small volume displacement is not extruded laterally to any substantial extent and cannot spread into the visible area of the glass.

The use of two gaskets which serve to selectively accommodate compressive and tensive forces provides an effective cushion for the glass which is mounted and the action is durable. Thus, the gaskets are capable of resealing should this be required. Moreover, the two gaskets seal together under light pressure, making for quick and easy asembly, and the glass can be removed subsequently if required. At the same time, the irregularities in the frame are overcome by the extensibility and conformability of the B-gasket and a weathertight seal is easily provided.

It is not feasible to provide curved glass lights, such as automobile windshields, so accurately formed that the flange in the frame is uniformly spaced from the surface of the glass. Thus, to insure sealing contact of the doughy B-gasket with both the irregular flange surface and the firm A-gasket, the doughy B-gasket should have substantial thickness, for example, about five hundredths to twenty four hundredths of an inch, and may be as great as about thirty hundredths of an inch. Excess thickness is mainly uneconomical and unnecessary. The minimum thickness is determined mainly by the space variations between the flange and the glass surface and the necessity to provide a sufficient mass of material in the doughy B-gasket to allow absorption or attenuation of tension forces therein by deformation and shifting of the mass of the doughy B-gasket without causing an excessive strain at the interface between the doughy B-gasket and flange, or between the firm A-gasket and glass face. Because the doughy B-gasket has some resiliency it tends to restore slowly to its original form similar to a bread dough upon release of tension or compressive forces.

By imparting tackiness to the doughy B-gasket it adheres to the firm A-gasket by contact under light pressure. If desired, the firm A-gasket can be rendered tacky by a tacky coating or preferably by compounding the firm A-gasket to impart tackiness thereto. The latter is preferred because this assists in producing adherence of the firm A-gasket to the glass. This adherence to the glass may be improved by first coating the glass adjacent its edge, with any of the various primer compositions known for this purpose.

In accordance with preferred practice of the invention, the support element which is typically the pinch weld flange and the element which is supported in spaced relation with respect to the pinch weld flange (the windshield) are maintained apart by a resilient mount which comprises in the invention the two self-sustaining gaskets which have been referred to. These gaskets are constituted by preformed elastomeric strips. The first of these strips which is secured to one of the elements is too stiff to handle tension forces without delamination if used alone. The second strip secured to the other of the elements is too soft and deformable to handle compression without flowing away if used alone. These two strips are strongly adhered together at an interface which is narrower than the width of the soft deformable strip and the two strips are each self-sustaining and resilient. However, the first strip is harder, more resilient and less stretchable or elongatable than the second strip and, as a result of the use of two strips which are physically interrelated in the manner noted, the composite is better able to resist force than either strip alone. When tension forces are encountered, the soft and deformable second strip yields and stretches more than the first strip to accommodate these tension forces. When compressive forces are encountered, the second strip will flow and the compressive force is primarily borne by the first strip.

Relating the foregoing to the A-gasket and B-gasket referred to hereinbefore, the harder and more resilient first strip is the A-gasket and it is preferably of generally triangular construction with the base of the triangle being adhered to the supported panel and with the apex of the triangle being preferably positioned within the base line of the triangle. Correspondingly, the second soft and deformable strip corresponds to the B-gasket and it is preferably flat, wider than the apex of the triangular A-gasket which is adhered to it and secured to the pinch weld flange which is the support element of the mounting unit.

In its preferred aspects, the present invention utilizes a strip (also termed a tape or bead) constituted by a preformed mixture of curable elastomer, plasticizing oil and filler, precured to a condition of resilience. The cure is accomplished by curing agents and by the use of elevated temperatures. For best results in accordance with the invention, the elastomer is precured substantially completely, especially in the A-gasket. An extensive cure is less important in the B-gasket.

The use of a precure is of especial significance in the production of the A-gasket in order that the composition possess a desirable balance of sufficient resilience to provide limited load bearing capacity and capacity for elongation.

Accordingly, the tapes or beads which are obtained in the invention and which employ a balanced proportion of cured elastomer, plasticizing oil and filler, provide a sticky stretchable body which is form-retaining and resilient.

As previously indicated, the invention employs two coacting sealing elements, one of which is required to be stiffer and less elongatable than the other. The stiffer sealing element is formulated to include a somewhat larger proportion of fibrous filler. The fibrous filler, such as asbestos, provides in the cured tape or bead greater rigidity and reduced capacity for elongation. The softer gasket member can be formulated to include a somewhat larger proportion of oil.

The respective sealing elements exhibit a strong capacity to stick to one another, in the absence of any extraneous adhesive, even though adherence to other surfaces such as release paper or human skin is not strong.

In line with the foregoing, the cured composition which is employed should contain at least 75 parts of oil plasticizer per 100 parts of elastomer and at least 75 parts of particulate filler per 100 parts of elastomer to provide a structure which is deformable. The elastomer, at least in the first or A-gasket, should be cured to provide resilience indicated by the capacity to bear load.

It is preferred in accordance with the invention to mix the components of the respective strips in order to provide a uniform admixture and then to extrude the mixture into the strip form which is desired, e.g., a flat strip or the triangular strip as desired dependent upon the formulation which is selected. Thereafter, the preformed strip upon a release paper support is cured in an oven in order to provide the resilience which is needed, especially in the A-gasket which should be capable of supporting at least a portion of the load of the windshield, for example.

The following detailed description is made in connection with a glass windshield in an automobile. However, the invention is also applicable to glass installations in windows of buildings, and to other situations where a panel, which need not be of glass and need not be transparent, is mounted in a frame.

The invention is described in greater detail in connection with the accompanying drawing and specific examples illustrating preferred embodiments of the invention.

In the drawing:

FIG. 1 is a fragmentary perspective view of a windshield mounting embodying the invention;

FIG. 2 is a cross sectional view on line II—II of FIG. 1 with the parts in initial contact assembly;

FIG. 3 is a view similar to FIG. 2 showing the effect of compression on the assembly;

FIG. 4 is a view similar to FIG. 2 showing the effect of tension on the assembly;

FIG. 5 shows the tape and glass assembly;

FIG. 6 shows the metal frame and tape assembly ready to receive the glass assembly;

FIG. 7 is an enlarged cross sectional view of a preferred shape tape on a backing strip; and FIG. 8 shows another appropriate shape for the generally triangular tape.

Referring to the drawing, FIGS. 1 and 2, there is illustrated the front end of an automobile in which the windshield opening is bounded by the roof 1, side posts 2, 3, and bottom rail 4. The body is formed to provide an inwardly extending flange 5, generally transverse to the plane of the opening, and a flange 6 generally parallel to the opening. The latter flange is joined to a flange 7 of the body and is generally called the pinch weld flange. This pinch weld flange 6 generally forms the backstop for the windshield light 8. The opening for receiving the back light of the automobile is of generally similar construction and need not be specifically described.

It is not desirable that the windshield light bear directly on the winch weld flange in glass to metal contact. In operation, the automobile is subject to vibration and torsional forces which would damage the glass unless it were resiliently mounted. It is usual to position resilient spacer blocks at the bottom and sides of the flange to prevent the edge of the light from contacting the inwardly extending flange. In my construction the provision of such spacers is preferred but is not essential.

Referring to FIGS. 2 and 6 there is shown a layer of tacky, doughy tape 11 located on the pinch weld flange. The tape 11 may be supplied mounted on a long backing strip, of paper or the like, conveniently formed into a spiral roll, the backing strip having been treated with a silicone or similar release material before positioning the tape thereon to reduce adherence of the tape thereto. This arrangement for handling and transporting a tape is known in the art. The backing strip facilitates insertion of the tape in place, after which the backing is easily stripped off. When positioned on pinch weld flange 6 the tape forms the tacky, doughy B-gasket referred to herein. The tape 11 easily sticks to itself merely on contact, so that a closed circuit gasket is formed by a slight overlap at the ends of the gasket. If desired, before applying the tape, the pinch weld area may be primed with a suitable material, for example, a rubber solution, to improve adhesion of the gasket thereto.

FIG. 5 shows an A-gasket 12 applied to the glass light 8 adjacent the edge, this gasket being extended entirely around the light. The terminals of the A-gasket may be overlapped laterally, or they may be joined end to end if desired. The gasket 12 is firm and resilient. It is preferred to coat the glass adjacent the edge with a primer coating (not illustrated), for example, a low viscosity rubber based primer, to promote adhesion of the gasket to the glass. Preferably the A-gasket 12 is compounded to have a more or less permanent tackiness, but if desired, the tackiness can be produced by a coating or treatment of the gasket material. The tackiness of the A-gasket improves adhesion to the glass and insures bonding by contact to the doughy B-gasket 11 upon assembly. The firmness of A-gasket 12 can be varied through wide limits. By way of comparison I point out that the doughy B-gasket 11, when stretched, behaves similar to a bread dough. On the other hand, if the A-gasket 12 is stretched and released it springs back, more or less slowly to its original shape and thus resembles the qualities of elastic rubber. The gaskets preferably have little or no cold flow.

The windshield light may be inserted by hand and when placed in the opening the A-gasket 12 contacts B-gasket 11 and immediately bonds thereto. However, if the spacing between the glass face and the pinch weld flange is not uniform there may be space between the two gaskets at some points. Added or continued pressure is applied to the windshield light so as to compress the portions of the A-gasket 12 and B-gasket 11 already in contact and thus close any space between the two gaskets. This results in penetration of the B-gasket by the firm A-gasket and in complete contact at the interface of gaskets 11 and 12. Now, when the pressure is released the glass light can move away from the pinch weld flange due to restoration forces in the gaskets, but the doughy B-gasket 11 maintains its bond to A-gasket 12 and elongates as much as necessary to do so, and thus the two gaskets continue to maintain the seal between the glass and pinch weld flange. Under such condition, because the doughy B-gasket is more flabby than the A-gasket, the greater amount of elongation is induced in the B-gasket. Over a period of time the B-gasket may permanently change its shape by cold flow to reduce or eliminate internal strains, so the strain between the glass and A-gasket 12 is kept within the adhesive and cohesive limits thereof.

In FIG. 3 I have shown on an exaggerated scale the action when the light is forced toward the pinch weld flange from the position shown by broken line 13. The A-gasket 12 will compress slightly and its nose will also penetrate the doughy B-gasket 11 causing the material of B-gasket to build up at 14 around the gasket 12. Since the glass light 8 is always spaced from the pinch weld flange 6 by the interposed firm A-gasket 12 this built up material is not extruded laterally along the glass and does not tend to creep out along the glass.

FIG. 4 shows on an exaggerated scale the action when pressure is released on the light. The glass and A-gasket attached thereto will spring back from the position shown by broken line 15, and at those sections of greater space between the pinch weld flange and glass the gaskets will be subject to tension. However, because of the flabby nature of the doughy B-gasket 11 it will be stretched much more than the A-gasket 12 but will not break its seal. Eventually, the material of B-gasket 11 may cold flow to relieve internal stresses and this will relieve any interfacial strain between A-gasket 12 and glass 8.

After assembly, suitable reveal moulding may be applied, for example, as illustrated in Patent 3,155,422.

The properties of the two gaskets 11 and 12 heretofore mentioned may be varied in degree. The doughy character of B-gasket 11 may vary between a stiff dough and a flabby dough. If the dough is too weak and flabby it may break in tension under weak forces and loose its seal with A-gasket 12, or it may not hold the glass firmly enough to resist forces pushing the glass outwardly. Also, too flabby a dough will allow excessive movement of the light to and from the pinch weld flange under the variable conditions encountered by the automobile. On the other hand, too stiff a dough may not absorb sufficient strain to insure against a break in the bond between the firm A-gasket and the glass, or between the B-gasket and the pinch weld flange, and may result in a break in the seal.

If the A-gasket 12 is too firm or too rigid, it will tend to straighten out too strongly when attached on the curved windshield and thus will interpose a strain at the interface of the glass and gasket. The glass mounting is subject to oscillating and torsional forces under road conditions so the glass is subject to sliding and gyrating forces as well as pressures toward and away from the pinch weld flange. If A-gasket 12 is too soft it will allow the glass to move excessively in this way. Thus, it will be seen that the particular degree of firmness of A-gasket 12 and the degree of doughiness of B-gasket 11 may be varied to accommodate the conditions expected to be encountered.

Although the above explanation and description are made in relation to the windshield light, similar considerations apply in relation to the back light. Also, while the above description states the doughy B-gasket 11 is applied to the pinch weld flange and the firm A-gasket 12 is applied to the glass, the relative location of these gaskets may be interchanged.

Tape compositions suitable for use on A-gaskets and B-gaskets in general comprise one or more elastomers, plasticizers and fillers and which may optionally include tackifiers and other agents for special purpose. The specific properties of the tape compositions can be varied by the selection of ingredients, their proportions, and the process by which they are compounded and treated, but practice of the invention will be made clear by the presentation of examples of presently preferred practice.

Examples of elastomers useful in compounding tapes suitable for this invention include butyl rubber, chlorinated butyl rubber, brominated butyl rubber (for example, as described in U.S. Patent 2,903,437 to Van Epp), butadiene-styrene rubbers, high molecular weight polyisobutylene rubber (for elample, Vistanex polybutene B-80, B-100 and B-120), butadiene-nitrile rubbers, polychloroprenes, natural rubber, polyisoprene, ethylene-propylene rubber (for example, EPR 404, Enjay Chemical Co.) and ethylene-propylene terpolymers (for example, EPT 3509, Enjay Chemical Co.), and including ethylene-propylene-dicyclopentadiene terpolymers sold by Dutch State Mines. Ethylene-propylene terpolymers and ethylene-propylene rubber are elastomers which are random polymers of ethylene and propylene, so they can contain some block structures of ethylene or propylene in their molecular structure. In the terpolymers there is in addition an unsaturated side chain which provides a site for vulcanization. The various elastomeric polymers may be used in selected mixtures. Suitable butyl rubbers are copolymers of an olefin or a diolefin, for example, copolymers of (a) isobutylene with (b) butadiene, isoprene, dimethyl butadiene, pentadiene or piperylene, in the ratio range of about 70 to 99.5 parts of weight of (a) and 30 to 0.5 part by weight of (b), having a preferred molecular weight range of about 50,000 to 65,000 (Staudinger). Various grades of such butyl rubbers containing isobutylene are available under the designations GR–I, GR–I–17, GR–I–14, GR–I–15, GR–I–40, GR–I–60 and GR–I–80. (Examples are Enjay Butyl 365 and Enjay Butyl 218.) Suitable halogenated butyl rubbers are those produced by halogenating the butyl rubbers above described, for example, as disclosed in U.S. Patent 2,944,578, preferably those containing approximately one halogen atom for each double bond. Preferred chlorinated butyl rubber contains about one chlorine atom for each double bond, and having a molecular weight between 300,000 and 500,000, such as Enjay Butyl HT 10–66 of Enjay Chemical Co.

In general the various butyl rubber and chlorinated butyl rubber compositions commercially available can produce tapes exhibiting high hysteresis which is a desirable property in both gaskets, and are preferred, and this property can be modified by selection of other ingredients in the tape. The term butyl rubber identifies copolymers of isobutylene with a diene such as butadiene, isoprene, dimethylbutadiene, pentadiene or piperylene in the weight ratio range of about 70 to 99.5 parts isobutylene to 30 to 0.5 part of the diene component.

It is to be observed that the processing oils and other plasticizers, and the large proportion of plasticizer and filler also increase hysteresis. The use of natural rubber, butyl rubber cross linked with divinylbenzene, or polyisobutylene in the molecular weight range of about 80,000 to 120,000, polychloroprene ("neoprene") as well as other low hysteresis elastomers, is desirable. Some of these produce an increase in spring back values.

Plasticizing oils generally increase softness and increase elongation and cold flow. Processing oils serve as inexpensive plasticizers. There are hundreds of such oils, which are generally naphthenic and paraffinic hydrocarbon compounds, commercially available under the trade names of the suppliers. They are generally sold as pale or red engine oils, are free of additives, and the preferred oils are those having a viscosity range at 100° F. of about 100–4,000 SUS (Saybolt Universal Seconds). Examples of such oils by trade names are, Necton 60, Famax 58, and Coray 80 and Sun Oil 2280. I may use them in the ratio of about one to two and a half times the weight of elastomeric polymer.

Examples of other suitable plasticizers are certain polychlorinated polyphenyls known commercially as "Aroclor" 1254, "Aroclor" 1268, low molecular weight polyisobutylene ("Vistanex" LM–MS), medium viscosity propylene polymer (Polypropene C–175 of Amoco Chemicals Corp.), and polybutenes (for example, Oronite 128 and Polybutene H 1900). Fibrous fillers, such as asbestos and platy talcs and hydrated silicas, reduce or retard cold flow, and are present in the ratio of about 30 percent to 150 percent of elastomer polymer.

It is generally preferred to include tackifiers in the compositions. Examples of suitable tackifiers are chlorinated biphenyls illustrated by "Aroclor" 1254, "Aroclor" 1268 (which "Aroclors" also function as plasticizers) and "Aroclor" 1260, non-reactive polymethylol phenol resin (commercially available under the names Amberol ST–137X; Catalin 8318; and SP–1047 of Schenectady Varnish Co.), rosins, hydrogenated rosins and esterified rosins (Pentalyn H, Stay-Belite ester 3) and ethyleneglycol monobutyl ether pelargonate. Adhesion to glass and metal can be increased by incorporating known adhesion promoters, for example, gamma-amino propyltriethyloxy silane (Silane A–1100 of Union Carbide Corp.), rosins, rosin esters and the like. The silane compound may be supplied to the glass as a primer to promote adhesion.

Any of the known curing agents may be employed, the particular curing agents selected being determined in part by the elastomer which is selected. For example, with butyl rubbers I prefer to use paradinitrosobenzene or para-quinone dioxime with lead dioxide ($PbO_2$) or other oxidizing agent. With chlorinated butyl rubber the preferred curing agent is zinc oxide. Suitable accelerators may be used in each case, and the compositions may include other substances to facilitate compounding and treatment, such as, acid receptors, scorch retardants, roll release agents, and cure retarders, and the like.

The following examples illustrate preferred embodiments of the tape compositions forming part of the invention.

EXAMPLE I.—A–GASKET

| Component: | Pounds |
|---|---|
| (1) Chlorinated butyl rubber (see note 1) | 50 |
| (2) Nonheat-reactive solid condensate of phenol with formaldehyde having an acid number of 20–40 (tackifier) | 21 |
| (3) Hydrogenated Wood Rosin Ester (see note 2) | 5 |
| (4) Asbestos fiber | 45 |
| (5) Precipitated hydrated silica having a surface area of 140–160 sq. meters/gm. | 15 |
| (6) Platy talc | 17.5 |
| (7) Processing Oil—SUS at 100° F.=2907, Aniline point =266° F. | 57 |
| (8) Carbon black | 10 |
| (9) Tall oil fatty acid (wetting agent) | 1 |
| (10) Heat-reactive phenol-formaldehyde condensate in 95% water solution (adhesion promoter) | 5 |
| Curing agents: | |
| (11) Di-ortho-tolylguanidine salt of dicatechol borate | 1 |
| (12) Zinc oxide | 1 |
| (13) Zinc chloride | 1 |

Note 1.—A high molecular weight (350,000–400,000) copolymer of 98–98.5% isobutylene with 1.5–2% isoprene, chlorinated to contain 1.1–1.3% by weight of chlorine, containing about 1–2 mol percent unsaturation, and having a Mooney value of 50–60.

Note 2.—Hydrogenated wood rosin ester having an ASTM Ring & Ball softening point of 68° C., an acid number of 165 and a saponification number of 167.

Procedure

The chlorinated butyl rubber is charged into a jacketed rotary double arm mixer, and then the hydrogenated wood rosin ester and the nonheat-reactive phenol-formaldehyde resin tackifier are added and mixed to a homogeneous mass, the mixing being carried out at a temperature of about 160° F. Next, the carbon black is added and mixed into a smooth consistency. Then the asbestos and about 19 parts of the processing oil are added and mixed in. Now the hydrated silica, about 19 parts of processing oil, and the talc are mixed in. Up to this point, the mixing operation occupied about two hours.

The balance of the processing oil is added and the mixture is cooled to below 120° F., and the heat-reactive phenol-formaldehyde condensate is worked in. (This latter ingredient is useful in conjunction with the use of an amine silane primer on the glass.) Then the di-orthotolyguanidine salt of dicatechol borate, the zinc oxide, and the zinc chloride are added and mixed in. The mixture is then discharged from the mixer and is extruded to form a tape of generally triangular cross section shown in detail with dimensions in FIG. 7, this tape being deposited upon and carried away by a suitable release backing. The tape on the release backing is cured for 4 hours at 210° F. in a hot air oven, and achieves resilient load bearing properties and is stable on storage at temperatures of 200° F. It exhibits good tackiness to metal and glass.

EXAMPLE II

In commercial practice, it is desirable to employ commercially available products and Example I is repeated using a corresponding weight of commercially available products as listed below for the corresponding component in Example I. Essentially the same results are obtained.

EXAMPLE IV

Consistent with the desire to employ commercially available materials, Example III is repeated using a corresponding weight of commercially available products to

| Component | Trade name | Supplier |
|---|---|---|
| 1. Chlorinated Butyl Rubber | Butyl HT 10-66 | Enjay Chemical Company. |
| 2. Nonheat-reactive phenolformaldehyde resin | Amberol ST-137X | Rohm & Haas Co. |
| 3. Hydrogenated Wood Rosin Ester | Staybelite Resin | Hercules Powder Co. |
| 4. Asbestos fiber | 7MO6 Grade | Johns Manville. |
| 5. Hydrated Silica | Hi-Sil | PPG Chemicals. |
| 6. Platy talc | Mistron Vapor | Sierra Talc and Chemical Co. |
| 7. Processing Oil | Sun Oil 2280-3 | Sun Oil Co. |
| 8. Carbon black | P-33 Carbon black | R. T. Vanderbilt Co. |
| 9. Tall Oil Fatty Acid | Acintol FA2 Tall Oil Fatty Acid | Arizona Chemical Co. |
| 10. Heat-Reactive phenolformaldehyde resin | BRL 2741 | Union Carbide Corp. |
| 11. Di-ortho-tolylguanidine salt of dicatechol borate | Permalux | DuPont. |

EXAMPLE III.—B-GASKET

Component: Pounds
- (1A) Chlorinated butyl rubber (see note 1 of Example I) — 700
- (1B) Divinyl benzene cross-linked butyl rubber (see note 3) — 700
- (2) Nonheat-reactive solid condensate of phenol with formaldehyde having an acid number of 20–40 (tackifier) — 588
- (3) Hydrogenated wood rosin ester (see note 2 of Example I) — 140
- (4) Asbestos fiber — 840
- (5) Precipitated hydrated silica having a surface area of 140–160 sq. meters/gm. — 420
- (6) Platy talc — 476
- (7) Processing oil—SUS at 100° F.=2907, aniline point=266° F. — 2000
- (8) Carbon black (mineral oil dispersion—59% solids) — 476
- (9) Tall oil fatty acid (wetting agent) — 28
- (10) Heat-reactive phenol-formaldehyde condensate in 95% water solution (adhesion promoter) — 14

Curing agents:
- (11) Di-ortho-tolylguanidine salt of dicatechol borate — 3.5
- (12) Zinc oxide — 17.5
- (13) Zinc chloride — 3.5

Note 3.—Copolymer of 98–98.5% isobutylene with 1.5–2% isoprene cross-linked with 0.5% divinyl benzene to increase resiliency (Mooney value above 70).

The mixing procedure for this composition is the same as that described in connection with Example I, except that the chlorinated butyl rubber and the divinyl benzene cross-linked butyl rubber are worked in together.

The material is extruded as a flat strip or tape about .56 inch wide and about .160 inch thick, on a paper backing strip treated with a release coating. The strip is cured for 4 hours at 210° F. in a hot air oven.

It should be observed that the differences between the B-gasket composition of the present Example III and the A-gasket composition of Example I include replacement of part of the butyl rubber by a modified butyl rubber, an increased proportion of plasticizing oil and a decreased proportion of stiffening filler, e.g., the asbestos. The B-gasket strip is soft and dough-like, instead of resilient and load-bearing as is the A-gasket of Example I, and both exhibit hysteresis. Upon low pressure contact, the two gaskets merge together at an interface and adhere strongly to one another.

In use, the A-gasket is adhered to the periphery of a glass windshield and the B-gasket is adhered to the pinch weld flange, and the windshield is positioned in its correct location and pressed lightly home. In use, and as has been described hereinbefore, the B-gasket is compressed by the load-bearing A-gasket when compressive forces are encountered and the B-gasket becomes extended when tensive forces are encountered.

provide essentially the same results. With respect to components 1A, 2, 3, 4, 5, 6, 7, 9, 10 and 11, the commercial products used are listed in Example II. With respect to component 1B, the divinyl benzene cross-linked butyl rubber, the product used is Polysar XPRD-A-925, a product of Polymer Corporation Ltd. (Canada). With respect to component 8, the carbon black, the product used is Statex M-70, a product of Columbian Carbon Co. of New York City.

The invention is not to be construed by any abstract of disclosure, but its features are instead characterized in the description given hereinbefore and is defined in the claims which follow.

I claim:
1. A sealed panel structure comprising a frame having an opening therein and a panel member covering said opening, said frame providing an inwardly extending peripheral flange member having a face generally parallel to the plane of the opening and directed toward said panel member whereby said frame defines an unobstructed opening for receiving said panel member, and said panel member having a face directed toward said flange member, a generally flat strip of permanently tacky, doughy elastomeric material having one face in adhering contact with one of said panel and flange member faces and extending substantially around said opening, and a self-sustaining strip of firm, resilient elastomeric material in adhering contact with the other face of said flat strip and in adhering contact with said face of the other of said panel and flange members providing substantially continuous sealing adherence of said strips and said members around the periphery of said opening, so that said contacting strips are interposed between said faces of said panel and flange members and hold said panel and flange members assembled, said tacky, doughy strip yielding under compressive force and said firm resilient strip being load bearing and serving as a spacer to resist compression to limit the space between said panel member and said flange member.

2. A sealed panel structure as specified in claim 1 wherein said firm strip is in adhering contact with said panel member.

3. A sealed panel structure as recited in claim 1 wherein said elastomeric materials are selected from butyl rubber, divinylbenzene cross linked butyl rubber, and mixtures thereof.

4. A sealed panel structure as specified in claim 1 wherein said tacky, doughy strip is too soft and deformable to receive compression forces without flowing and said firm resilient strip is firmer and more resilient than said tacky, doughy strip whereby under compression said tacky, doughy strip yields and the compressive movement is limited by said firm resilient strip.

5. A sealed panel structure as recited in claim 4 in which said firm and tacky, doughly strips are constituted by a composition consisting essentially of an elastomer, at least 75 parts of oil plasticizer per 100 parts of elastomer, and at least 75 parts of filler per 100 parts of elastomer.

6. A mounting strip as recited in claim 5 wherein said firm strip composition is precured.

References Cited

UNITED STATES PATENTS

| | | | |
|---|---|---|---|
| 3,037,810 | 6/1962 | Kelley | 52—400 |
| 3,241,277 | 3/1966 | Coppock | 52—208 |
| 3,416,833 | 12/1968 | Griffin | 52—208 |

FOREIGN PATENTS 900,766  1962  Great Britain.

JOHN E. MURTAGH, Primary Examiner

U.S. Cl. X.R.

52—309, 397; 296—93

PO-1050
(5/69)

UNITED STATES PATENT OFFICE
CERTIFICATE OF CORRECTION

Patent No. 3,478,475          Dated November 18, 1969

Inventor(s) Donald R. Strack

It is certified that error appears in the above-identified patent and that said Letters Patent are hereby corrected as shown below:

Column 6, line 57, "elample" should read --example--

Column 8, line 33, "zinc oxide-----1" should read
  --zinc oxide-----5--

Column 8, line 61, "tolyguanidine" should read
  --tolylguanidine--

SIGNED AND
SEALED
FEB 24 1970

(SEAL)
Attest:

Edward M. Fletcher, Jr.
Attesting Officer

WILLIAM E. SCHUYLER, JR.
Commissioner of Patents